Oct. 23, 1945.   F. O. HESS   2,387,583
AIRCRAFT HEATING MEANS
Filed Sept. 4, 1941   2 Sheets-Sheet 1
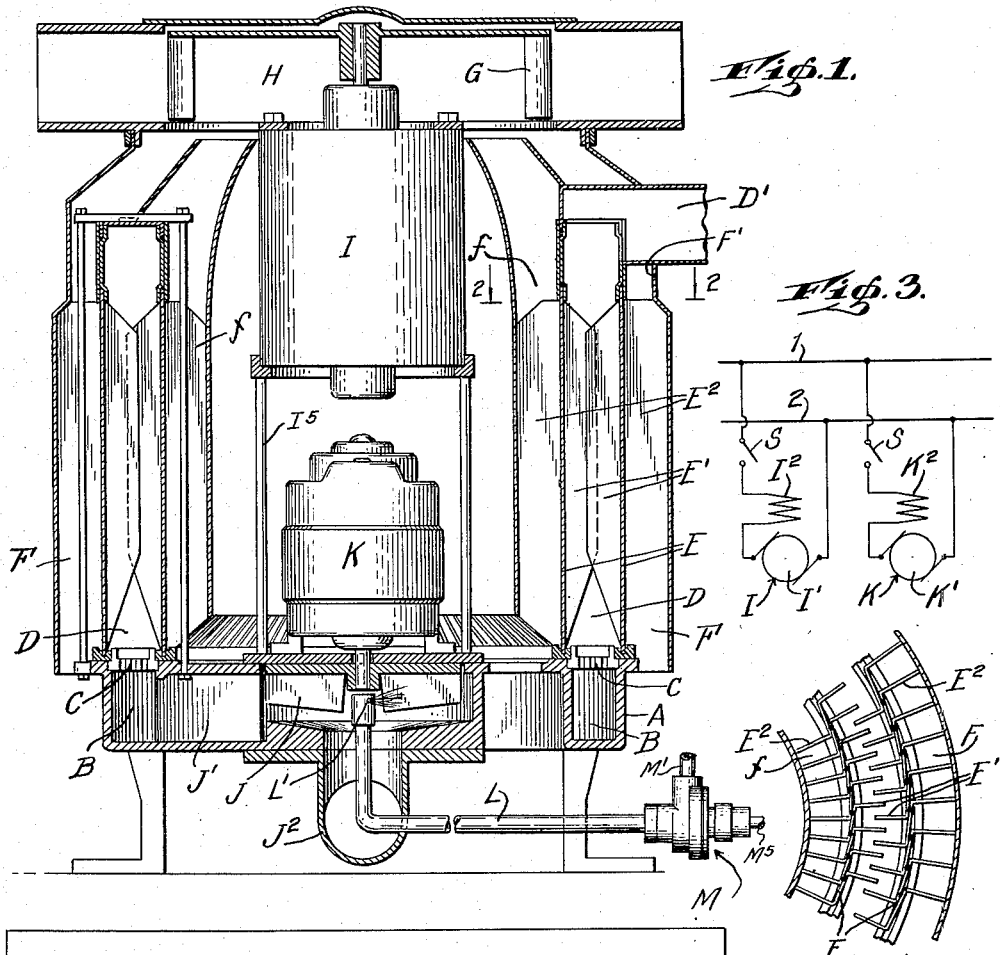
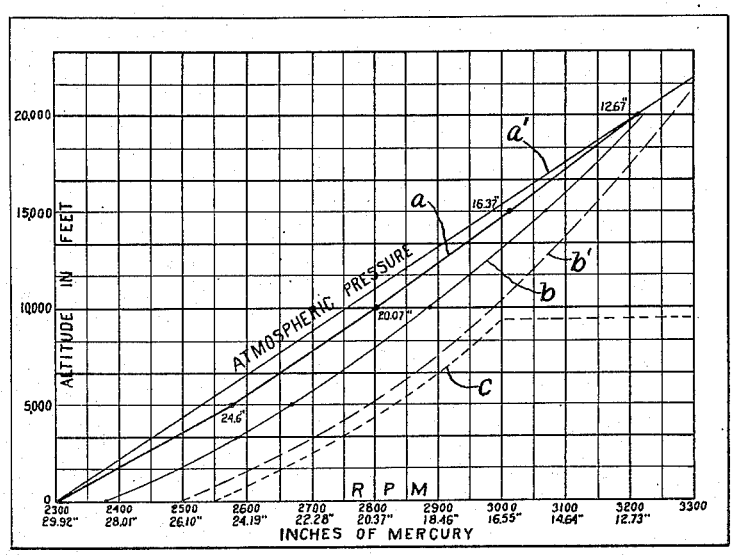
INVENTOR
FREDERIC O. HESS
BY John E. Hubbell
ATTORNEY Oct. 23, 1945.                F. O. HESS                2,387,583
                         AIRCRAFT HEATING MEANS
                   Filed Sept. 4, 1941          2 Sheets-Sheet 2
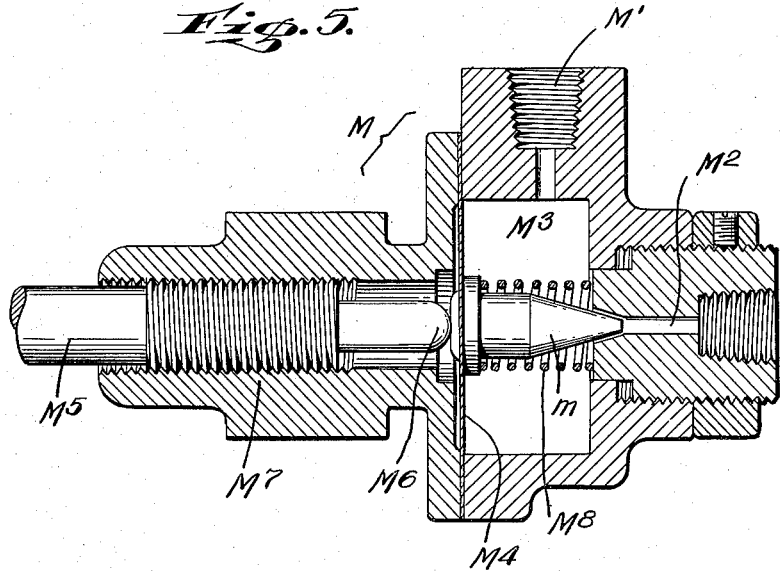
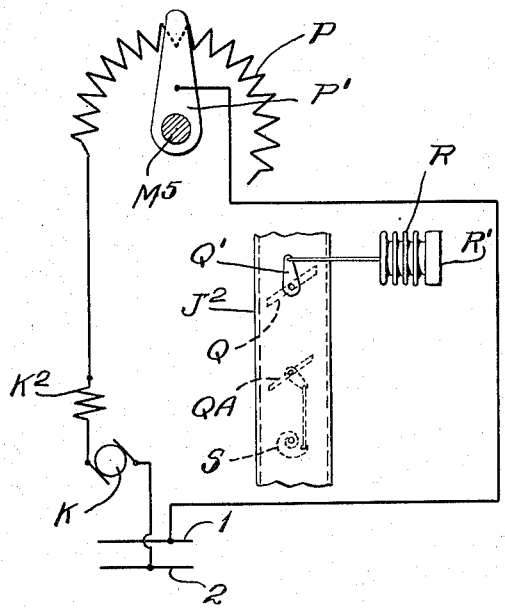
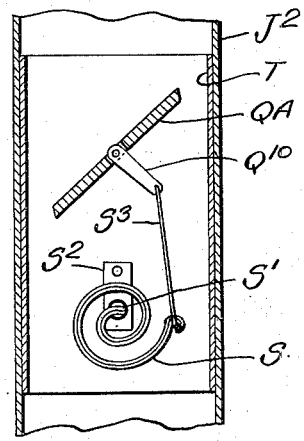
INVENTOR
FREDERIC O. HESS
BY
John E. Hubbell
ATTORNEY Patented Oct. 23, 1945

2,387,583

UNITED STATES PATENT OFFICE 2,387,583

AIRCRAFT HEATING MEANS

Frederic O. Hess, Germantown, Pa., assignor to Selas Corporation of America, a corporation of Pennsylvania Application September 4, 1941, Serial No. 409,439

8 Claims. (Cl. 158—28)

The general object of the present invention is to provide improved aircraft heating means adapted to supply heated air for use in heating the cabin spaces of transport planes, and the cabin and other spaces of war planes in which heating is desirable, and for defrosting and other purposes.

More specifically, the object of the invention is to provide an improvement for supplying combustion supporting air to the combustion space of an airplane heater, and usually, also, for circulating the heated air or moving it through distribution pipes, at volume rates which vary inversely with the density of the air being handled to promote satisfactory combustion conditions and effect more uniform heating by the circulating heated air, notwithstanding substantial variations in aircraft altitude and the temperature of the surrounding air and the resultant variations in the density of the atmosphere in which the airplane is enveloped.

More specifically, the object of the present invention is to provide improvements in an airplane hot air heating system of the general type disclosed in my prior application, Serial No. 348,-324 filed July 29, 1940, and disclosed in an improved form in the prior application, Serial No. 365,804, filed jointly by me and John W. Townsend on November 5, 1940, now Patent No. 2,314,-089, granted March 16, 1943, in which air is heated by a light weight heater having a heating space in which a combustible mixture of air and gasoline is burned and from which heat is given up to the air to be heated by a sheet metal heat exchanger structure having walls formed of sheet metal parts including integral fin extensions into the heating space and into the air heating passage.

In said prior applications it was proposed to avoid objectionable variations in the weight rate of supply of combustion supporting air to the airplane heater, due to substantial variations in the density of the atmosphere as the airplane altitude varies, by simply providing a throttling valve in the heating space inlet or outlet conduit which is connected to a device automatically responsive to variations in the pressure of the atmosphere through which the airplane is moving. Some provision of this kind is necessary because combustion supporting air is supplied to the heater which varies in density with changes in altitude of the airplane. As the altitude of the airplane increases and the density of the air decreases, such air must be supplied at a greater volume rate to provide an adequate amount of oxygen to support combustion and maintain satisfactory combustion conditions in the heater. In other words, to maintain the same satisfactory combustion conditions at sea level and at a high altitude of the airplane at which the air is considerably less dense than at sea level, the combustion supporting air must be supplied at a considerably greater volume rate at the high altitude than at sea level to provide an adequate supply of oxygen to support and maintain combustion. Heaters of the type just referred to are of such a character that even though the combustion supporting air is supplied thereto at an increasingly higher velocity with increase in altitude of the airplane, and such increase in the velocity at which the combustion supporting air is delivered to the heater is accomplished by elongation of the burner flame, nevertheless effective burning of the combustible mixture can be accomplished.

I have discovered that the volume rate at which combustion supporting air is supplied to the heater in a path of flow with the aid of a blower can be controlled and regulated more effectively by driving the blower with a variable speed electric motor possessing such characteristics that its speed varies inversely with the density of the air being moved by the blower. Hence, as the altitude of the airplane increases, the motor speed increases because the blower is moving air which is less dense than at lower altitudes. This increase in motor speed is quite substantial from sea level to a high altitude of about 20,000 feet, for example. Since in going from sea level to such a high altitude it is necessary to supply combustion supporting air at an increasingly greater volume rate to compensate for decrease in air density, it will be evident that a substantial portion of such compensation can be accomplished by driving the blower with a variable speed electric motor whose speed inherently increases with increase in altitude of the airplane to cause the blower to supply combustion supporting air to the heater at an increasingly greater volume rate with decrease in density of the air being moved by the blower.

It is desirable, together with a blower and driving motor therefor of the kind just described, to control or adjust the rate of movement of air in its path of flow to the heater in accordance with a condition affected by change in altitude of the airplane so as to compensate fully for variations in air density, whereby the blower can supply combustion supporting air at a weight rate which will produce satisfactory combustion conditions at different altitudes of the airplane. In accordance with the invention such control or adjustment of the rate of air movement to the heater is correlated to the ability of the motor to drive the blower at a speed which increases and decreases with increase and decrease, respectively, in the altitude of the airplane.

Thus, in accordance with the present invention I employ as the combustion supporting air moving means a fan of known type having a volumetric air discharge rate approximately proportional to the fan or blower speed, and drive such fan by a series wound electric motor energized by current supplied from a constant voltage source. A series motor when subjected to constant electric energizing conditions tends to operate at a speed which varies inversely with the torque opposing the motor movement. In consequence, as the air density diminishes and increases, the motor speed increases and decreases substantially to vary the rate of air movement when constant motor energizing conditions are maintained.

In the practical use of the present invention it will ordinarily be desirable to provide for an adjustment in the heat output of the airplane heater. In practice the heater output may advantageously be varied by varying the rate at which fuel is supplied to the combustion space. For maximum thermal efficiency it is theoretically necessary to increase and decrease the weight rate at which air is passed to the combustion space as the rate of fuel supply increases and diminishes. With my series motor and fan combination the weight rate at which combustion air is supplied may be varied by varying the amount of resistance in the motor energizing circuit or by the use of other known expedients for varying the speed of the series wound motor subjected to a constant load and energized from a constant voltage source. When such motor speed regulation is desired I may advantageously employ a controller manually adjusted to variably throttle the fuel supply to simultaneously effect the speed modifying variations in the motor energizing circuit in the general manner contemplated in my prior application, Serial No. 348,324.

For a better understanding of the invention, its advantages, and specific objects attained with its use, reference should be had to the accompanying specification and drawings in which I have described and illustrated a preferred embodiment of the present invention. It is to be noted, however, that my present invention is well adapted for use with aircraft heaters and heating systems varying widely in type and form.

In the drawings Fig. 1 is a vertical sectional view of an airplane heater embodying the invention; Fig. 2 is a fragmentary cross section of a portion of the heater taken on the line 2—2 of Fig. 1; Fig. 3 is a diagram illustrating energizing circuits for the two motors shown in Fig. 1; Fig. 4 is a diagram illustrating motor driven fan speed and airplane altitude relations; Fig. 5 is a sectional view of the throttling valve shown in Fig. 1; Fig. 6 is a view diagrammatically illustrating a motor energizing circuit which includes a controller for varying the motor speed and adjusting the fuel throttling valve; and Fig. 7 is a sectional view to illustrate more clearly the temperature responsive control means shown in Fig. 6.

In Figs. 1 and 2 I have illustrated somewhat diagrammatically an aircraft heater of the general type disclosed in the applications referred to above. The heater shown herein comprises a burner body A formed with an annular burner inlet chamber B. The chamber B is provided with an orifice top wall C of ceramic material, preferably in the form of radial laminae with grooves in their sides which serve as the burner orifices. A combustible mixture of air and atomized gasoline supplied to the chamber B passes therefrom through the orifices in the wall C into, and burns in a combustion space in the bottom part of chamber D. The chamber D is annular in horizontal cross section and has side walls E formed of thin metallic parts comprising fin or rib portions E' extending into the chamber D and other fin or rib parts $E^2$ which are external to the chamber D and extend away from the latter into air heating spaces F and $f$.

The air heated by the heater is moved through the spaces F and $f$ by an exhaust fan or rotary blower G mounted in an outlet chamber portion H of the heater structure. The impeller of the fan G is driven by an electric motor I located in the space surrounded by the chamber D and spaces F and $f$. A combustible mixture of air and atomized gasoline is supplied to the burner inlet chamber B by a fan J which is of the turbo blower type and is driven by an electric motor K. The latter is located directly beneath the motor I. The outlet J' of the fan J is closely adjacent to and communicates with the chamber B and the fan draws air, ordinarily from the external atmosphere, through an inlet pipe $J^2$. A liquid fuel, such as gasoline, for example, is supplied under suitable pressure through a supply pipe L and is discharged through a fine orifice L' in the form of relatively small, high velocity jet into the path of movement of the impeller blades of the fan J. The gasoline thus impinging against the rapidly moving impeller blades is atomized, and the fan J thus forms a means for supplying a combustible mixture of combustion air and atomized gasoline to the chamber B. As shown, the motor K is directly supported by the burner body A, and the motor I is indirectly supported by that body through a cage-like frame $I^5$. Products of combustion pass to the atmosphere from the chamber D through an outlet D'.

As shown diagrammatically in Fig. 3 the armature I' and field winding $I^2$ of the motor I are connected in series between supply conductors 1 and 2. Similarly, the armature K' and field winding $K^2$ of the motor K are connected in series between the supply conductors 1 and 2. In consequence, each of the motors I and K may have the typical characteristic of a simple, series wound motor, namely, of operating with a speed approximately inversely proportional to the torque opposing the motor armature movement, so long as a constant potential difference is maintained between the supply conductors 1 and 2.

In the diagram shown in Fig. 4 the ordinates represent altitudes in feet, and the abscissae represent atmospheric pressures expressed in inches of mercury and also represent motor speeds expressed in revolutions per minute. The curve $a$ of Fig. 4 illustrates normal variations in atmospheric pressure at levels varying from sea level to somewhat more than 20,000 feet above sea level, on the assumption that the atmospheric pressure at sea level is 29.92 inches of mercury, and on the further assumption that the temperature of the air decreases in proportion to the altitude above sea level from a temperature of about 70° F. above zero at sea level to a temperature of about 29° F. below zero at an altitude of 20,000 feet. Intermediate its ends, the curve $a$ is laterally displaced to the lower side of a straight line $a'$ connecting its sea level and 20,000 feet altitude points, although at no altitude does the displacement indicate a pressure difference amounting to more than a small fraction of an inch of mercury.

The curve $b$ of Fig. 4 may be called a speed-load torque curve, as it illustrates the speed variations of a typical series wound electric motor when energized from a source of constant voltage and employed, as is the motor K to drive a fan, such as the combustion air supply fan J subjected to a motor load torque which varies in proportion to variations in the density of the air moved due to variations in the pressure of the air indicated by the curve $a$. As is shown in Fig. 4, for altitudes in the vicinity of and above 20,000 feet, the corresponding portion of the curve $b$ is inclined to the line $a'$ at a slightly greater angle than is the corresponding portion of the curve $a$, but for lower altitudes the curves $a$ and $b$ are similarly concave and approximately parallel to one another.

In consequence, a motor having a speed load-torque curve like the curve $b$, will increase its speed and drive the blower J to cause combustion supporting air to be supplied to the combustion space of the heater at an increasingly greater volume rate with increase in altitude of the airplane. For operation with an altitude range varying from sea level to 30,000 feet above sea level, for example, a motor having the speed load-torque characteristic curve $b$ of Fig. 4, might well be replaced by a motor having a somewhat different speed load-torque curve such as the curve $b'$ of Fig. 4. Those familiar with the design of electric motors have long known how to produce motors with speed load-torque curves like the curves $b$ and $b'$ of Fig. 4.

If the circulating fan G of Fig. 1 is used to circulate air at the pressure of the atmosphere at the level of the airplane, the motor I may advantageously have exactly such a characteristic curve $b$ or $b'$ as conditions make desirable for the motor K. If the fans J and G were driven by a common series wound motor, as is considered practically desirable in some cases, that motor advantageously has such a speed load-torque curve as is desirable for the motor K.

It sometimes happens that the density of air at a given altitude may temporarily be widely different from the normal temperature at that altitude. For example, at 35,000 feet above sea level the atmospheric temperature above Miami, Florida, is normally about 50° F. below zero. As a result of unusual conditions, however, at 35,000 feet above Miami, Florida, temperatures as low as 140° F. below zero have been recorded. A drop in air temperature from 50° F. to 140° F. below zero results in a substantial increase in the air density, regardless of any accompanying, though lesser variation in atmospheric pressure which may exist at the altitude at which the temperature departure from normal is experienced. Regardless of how the density of the air at any altitude may vary from that normal for the atmospheric pressure at that altitude which is indicated by the curve $a$ of Fig. 4, a series wound motor energized from a source of constant voltage and driving a fan for moving air will supply such air at a speed which varies inversely with the density of the air being moved by the fan or blower.

While practical conditions may sometimes make it desirable to drive the combustion air supply and recirculating fans by a single motor, the use of separate motors for driving the two fans is advantageous in that it permits operation of the fan J at speeds substantially and desirably higher than the operating speeds of the fan G, and permits the speeds of the two motors to be regulated independently.

The use of the present invention with separate series wound motors for driving the fans G and J is especially desirable for use in an airplane in which the combustion air for the heater is drawn directly from the atmosphere by the fan J, and the products of combustion are discharged into the atmosphere as a result of the action of the fan J along, or supplemented by the operation of a similarly driven exhaust fan, and where air circulated by the fan G is maintained by a supercharger at an approximately constant pressure which may be of the order of ten pounds or so per square inch, when the airplane is at an altitude at which the atmospheric pressure is as low as, or lower than said constant pressure.

In such case, the speed of the fan G will vary as a result of changes in the airplane altitude and air density, substantially as does the fan J, so long as the cabin pressure is the same as the pressure of the atmosphere enveloping the airplane. With the supercharger in operation and maintaining a substantially constant cabin pressure, the speed of the fan G will cease to be proportional to the speed of the fan J, and will then normally vary only as a result of changes in the temperature of the air circulated, and as required to compensate for any failure of the supercharger to maintain an approximately constant cabin air pressure. In Fig. 4, for example, the curve $c$ is the speed load-torque curve of a typical series wound motor, operating at a constant voltage, to drive a fan recirculating cabin air at a pressure which varies with the external atmospheric pressure as the airplane altitude increases, until the pressure of the enveloping atmosphere falls to ten pounds and which is then maintained constant at ten pounds while the airplane is operating at higher altitudes. In case of an accidental interruption in the operation of the supercharger, the speed of the circulating fan motor will vary approximately in inverse proportion with the air density throughout the full range of air density variation.

To minimize risk of combustion products leakage into the airplane, and usually for other reasons, an exhaust fan may well be connected in many cases to the outlet D' from the combustion chamber D, to draw products of combustion out of the combustion chamber and discharge them into the atmosphere. The use of such a fan is disclosed in my prior application, Serial No. 348,324. In such case the exhaust fan operates to proportionally augment the draft producing effect of the fan J, and in accordance with the present invention, such an exhaust fan is desirably driven by a series wound motor operating at a constant voltage and having substantially the same speed-load torque curve as is desirable for the motor driving the fan J.

As previously stated, an airplane heating system of the type disclosed herein may advantageously include a fuel throttling valve. Such a valve M of a desirable needle valve form is shown in Figs. 1 and 5. The valve M comprises a valve casing with an inlet M' to and an outlet M² from a valve chamber M³. A valve member $m$ is coaxial with and directly controls the flow through the outlet port M². The latter has its inner portion of conical form to provide a seat for the conical end of the needle valve member $m$. The valve member $m$ has its end remote from the port M² connected to a flexible metallic diaphragm M⁴ forming one wall of the valve chamber and rigidly connected at its periphery to the valve casing. The valve member m may be welded to the central portion of the diaphragm M⁴. The latter may have its opposite side reinforced by a welded body or pad engaged by the rounded end M⁶ of a valve operating spindle M⁵.

The spindle M⁵ has a threaded portion in engagement with the internally threaded wall of a socket M⁷ formed in the valve casing in alignment with the port M². A spring M⁸ acting between the diaphragm M⁴ and the opposite wall of the valve chamber M³, biases the valve m for movement in the opening direction and thus causes the valve member m to follow the member M⁵ when the latter is rotated to give the valve an opening adjustment. As the total valve opening movement required may be of the order of 1/100 of an inch, the diaphragm may be formed of very thin flexible metal and still have an adequate operating life.

As shown diagrammatically in Fig. 6, the valve member m is associated with rheostatic means for increasing and decreasing the speed of the combustion air supply motor K as the valve member is opened and closed so as to maintain fuel to air ratio which will produce satisfactory combustion conditions at varying heat outputs of the heater. The rheostatic means comprises a rheostat arm P' carried by the valve spindle M⁵ which is moved along a resistance P to include more or less of that resistance in the series energizing circuit of the motor K, as the valve spindle is rotated to respectively decrease or increase the rate at which fuel is supplied to the heater. By manual adjustment of the spindle M⁵ of Fig. 6, it is thus possible to vary the rate of combustion in, and heat output from the associated heater while at the same time maintaining a satisfactory fuel to air ratio in the combustible mixture burned in the heater.

In accordance with the invention, the compensating adjustment of the motor speed in response to variations in air density, obtained when a series wound motor is combined with a fan having volumetric capacity approximately proportional to its speed, is combined with means for controlling and adjusting the combustion supporting air flow responsive to a condition affected by changes in altitude, such as, for example, changes in pressure and/or temperature of the enveloping atmosphere. Thus as shown in Fig. 6, I provide a butterfly damper Q in the combustion fan inlet pipe J² and connect the operating arm Q' of the damper to the movable end of a sealed expansible metallic bellows R adapted to elongate as the pressure of the enveloping atmosphere diminishes and having its other end connected to a support R' in fixed relation with the pipe J². If the bellows R has its interior exhausted and is subjected to a spring force tending to elongate it, it may be calibrated to adjust the damper Q to produce a throttling effect inversely proportional to the pressure, and independent of the temperature of the atmosphere throughout as wide a range of variation in atmospheric pressure as is practically desirable.

As will be apparent, the damper Q and bellows R may be adapted to provide a variable throttling effect which compensates to a substantial degree for departure from the non-parallelism at higher altitudes of the curves a and b of Fig. 4. In any event, the control or adjustment effected by damper Q may be correlated to the ability of the motor I to drive the blower or fan J at a speed which increases and decreases with increase and decrease, respectively, in the altitude of the airplane, whereby the blower can supply air to the combustion space of the heater at a weight rate which will produce satisfactory combustion conditions at different altitudes of the airplane.

In some cases it may be desirable to control or adjust the fuel to air ratio in automatic response to changes in the temperature of the enveloping atmosphere. Thus in some cases the maintenance of ignition may advantageously be facilitated by increasing the fuel to air ratio when the atmospheric temperature diminishes. This result may be obtained by the adjustment of a throttling damper QA shown in Fig. 6. The operating arm Q¹⁰ of the damper QA is connected to the free end of a spiral bi-metallic thermostat S which has its opposite end connected to a non-rotatable shaft S'. As shown in Fig. 7, the damper QA and thermostat S form part of a regulator unit including a casing T in the form of a tube or pipe section adapted to fit snugly in the fan inlet pipe J² and is advantageously adapted to be inserted in and removed from the pipe J². The butterfly damper QA may have the usual trunnion pivots journaled in the casing T at diametrically opposed points. As shown, the ends of the anchor shaft S' for the thermostat S are connected to supports S² mounted on diametrically opposed portions of the casing T and advantageously made adjustable relative to the casing T in the direction of the length of the latter. Such adjustment, as will be apparent, permits of an adjustment of the fuel to air ratio maintained with any particular atmospheric temperature.

If a body of air or other gas expanding and contracting as its temperature increases and diminishes is sealed in the bellows R shown in Fig. 6, the joint effect of the spring force tending to elongate the bellows and body of air sealed in the bellows is to give the damper Q an opening adjustment as the pressure of the enveloping atmosphere diminishes which is greater when the enveloping atmosphere is at a relatively high temperature than at a relatively low temperature.

While in accordance with the provisions of the statutes I have illustrated and described the best forms of embodiment of my invention now known to me, it will be apparent to those skilled in the art that changes may be made in the form of the apparatus disclosed without departing from the spirit and scope of my invention, as set forth in the following claims and that in some cases certain features of my invention may be used without a corresponding use of other features.

Having now described my invention, what I claim as new and desire to secure by Letters Patent is:

1. The combination with an airplane, of a heating system therefor comprising a heater having a combustion space associated therewith, means including a blower and passage means providing a connection therefrom to the heater for supplying to said space combustion supporting air which decreases and increases in density with increase and decrease, respectively, in the altitude of the airplane, said blower having a fan of a type which supplies the air at a volume rate approximately proportional to its speed, and means for driving said fan including a series wound electric motor whose speed varies inversely to its load torque when subjected to substantially constant energizing conditions.

2. The combination with an airplane, of a heating system therefor comprising a heater having a combustion space associated therewith, means for supplying to said space combustion supporting air which varies in density with changes in altitude of the airplane, said means comprising a fan of a type which supplies the air at a volume rate approximately proportional to its speed, and means for driving said fan including an electrical translating device having the speed load-torque characteristics of a series electric motor so that, when subjected to substantially constant energizing conditions, its speed inherently increases with decrease in the density of the air moved by the fan, thereby increasing the volume rate at which the air is supplied to the space.

3. The combination with an airplane, of a heating system therefor comprising a heater having a combustion space associated therewith, means for supplying to said space combustion supporting air which varies in density with changes in altitude of the airplane, said means comprising a fan of a type which supplies the air at a volume rate approximately proportional to its speed, means for driving said fan including a variable speed series wound electric motor which, when subjected to constant energizing conditions, will drive said fan at a speed which varies inversely to the load torque opposing its movement, and means for supplying fuel to said space at a weight rate substantially unaffected by changes in altitude of the airplane.

4. For use in an airplane, a heating system comprising a heat radiating unit having a combustion space associated therewith, structure to supply to said space for combustion therein a combustion mixture of fuel and combustion supporting air which decreases in density with increase in altitude of the airplane, said structure for supplying the air to said space including a blower having a fan which moves the air at a volume rate approximately proportional to its speed, and means for increasing the volume rate at which the air is supplied to said space by the fan with increase in altitude of the airplane to maintain satisfactory combustion conditions in said space at different altitudes during flight of the airplane, said last-mentioned means including a variable speed series electric motor for driving the fan whose speed increases with decrease in density of the air moved by the fan when energized from a source of electrical energy at a substantially constant voltage.

5. For use in an airplane, a heater having a combustion space associated therewith, means to supply to said space for combustion therein a combustible mixture of fuel and combustion supporting air which decreases in density with increase in altitude of the airplane, said supply means including structure operable to supply fuel at a regulated rate and a blower to supply the air, and means including a variable speed series wound electric motor for driving the blower whose speed automatically varies inversely with the density of the air being moved by the blower when energized from a source of electrical supply at a substantially constant voltage.

6. For use in an airplane, a heating system comprising a heat radiating unit having a combustion space associated therewith, and structure to supply to said space for combustion therein a combustible mixture of fuel and combustion supporting air which decreases in density with increase in altitude of the airplane, said structure for supplying the air to said space including a blower and a variable speed electric motor for driving the blower, said electric motor having the speed load-torque characteristics of a series electric motor so that, when energized from a source of electrical supply at a substantially constant voltage, its speed varies inversely with the density of the air being moved by the blower.

7. The combination with an airplane, of an independently operable heating system therefor comprising structure providing a heat radiating unit having a combustion space associated therewith and a passage in heat exchange relation with such unit for air to be heated, means for supplying a combustible mixture to the space, a fan for circulating the air to be heated through said passage, said fan being of a type which moves the air at a volume rate approximately proportional to its speed, and a variable speed series wound electric motor for driving said fan whose speed automatically varies inversely with the density of the air being moved by the fan when energized from a source of electrical supply at a constant voltage.

8. The combination with an airplane, of a heating system therefor comprising structure providing a heat radiating unit having a combustion space associated therewith and a passage in heat exchange relation with such unit for air to be heated, means for supplying to the space for combustion therein a mixture of fuel and combustion supporting air which varies in density with changes in altitude of the airplane, said supply means comprising a fan and connection therefrom to the space for supplying the combustion supporting air to the latter, a fan for circulating air to be heated through said passage, each of said fans being of a type which moves air at a volume rate approximately proportional to its speed, and variable speed electrical translating means provided with shaft means connected to drive said fans and having the speed load-torque characteristics of a series electric motor so that the speed at which the shaft means rotates varies inversely with the density of the air being moved by the fans when the electrical translating means is energized from a source of electrical supply at a substantially constant voltage.

FREDERIC O. HESS.

CERTIFICATE OF CORRECTION.

Patent No. 2,387,583.  October 23, 1945.

FREDERIC O. HESS.

It is hereby certified that error appears in the printed specification of the above numbered patent requiring correction as follows: Page 4, first column, line 25, before "fuel" insert --a--; page 5, first column, line 34, claim 4, for "combustion" first occurrence, read --combustible--; and that the said Letters Patent should be read with this correction therein that the same may conform to the record of the case in the Patent Office.

Signed and sealed this 29th day of January, A. D. 1946.

Leslie Frazer
First Assistant Commissioner of Patents.

(Seal)